M. L. KNODLE.
POULTRY FEEDER.
APPLICATION FILED DEC. 29, 1916. RENEWED SEPT. 7, 1917.

1,249,774.

Patented Dec. 11, 1917.

Inventor
Martin L. Knodle,
By Foster & Urbatsch
his Attorneys

Witness
Wm. Conway

UNITED STATES PATENT OFFICE.

MARTIN L. KNODLE, OF GLOUCESTER, NEW JERSEY.

POULTRY-FEEDER.

1,249,774.   Specification of Letters Patent.   Patented Dec. 11, 1917.

Application filed December 29, 1916, Serial No. 139,672. Renewed September 7, 1917. Serial No. 190,272.

*To all whom it may concern:*

Be it known that I, MARTIN L. KNODLE, a citizen of the United States, residing at Gloucester, in the county of Camden and State of New Jersey, have invented certain new and useful Improvements in Poultry-Feeders, of which the following is a specification.

My invention relates to improvements in poultry feeders, an object of the invention being to provide a feeder which may be attached to any ordinary receptacle, and which is operated by the poultry to cause a small quantity of feed to be discharged at a time, and thus make the poultry work for their own feed and prevent wastage, and at the same time insure a supply of clean food at all times.

A further object is to provide a feeder of the character stated, which can be manufactured and sold at an extremely low price, which is of extremely simple construction, easily adjusted to accommodate various foods, which is entirely sanitary, easily operated, and most efficient in the performance of the functions for which it is intended.

With these and other objects in view the invention consists in certain novel features of construction and combinations and arrangements of parts as will be more fully hereinafter described and pointed out in the claims.

Figure 1:
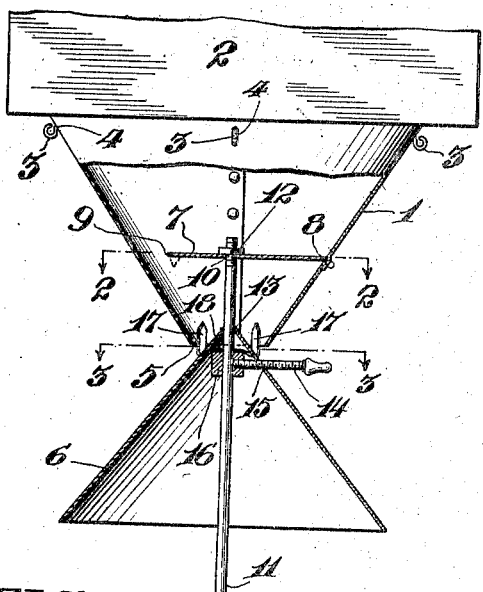
Figure 1 is a view partly in elevation, and partly in section illustrating my improvements.

1 represents a guide cone which may be attached to any ordinary receptacle 2, the latter forming no part of my invention, as I purpose to provide some form of attaching means whereby the cone 1 may be secured to any receptacle having an opening in its bottom so that the feed will fill the cone 1.

As a convenient means of attachment, I have shown ordinary screw eyes 3 which are projected through openings 4 in the upper larger end of the cone 1, and screwed into the receptacle 2, but I of course do not limit myself to any particular fastening means.

While I speak of the part 1 as a cone, it is, as a matter of fact, a truncated cone, and its lower open end 5 constitutes the feed outlet, into which a feed cone 6 projects.

The cone 6 serves the double function of valve and deflector, as will be more fully hereinafter explained.

Figure 2:
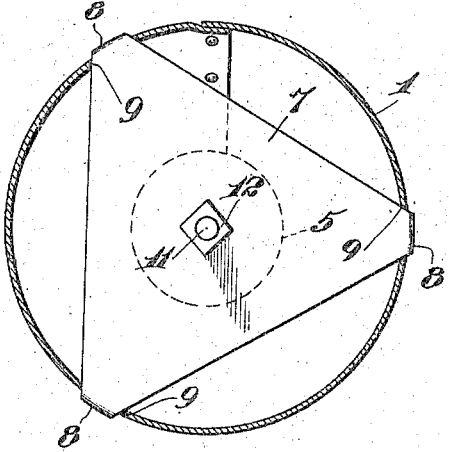
Fig. 2 is an enlarged view in transverse section on the line 2—2 of Fig. 1.
Figure 3:
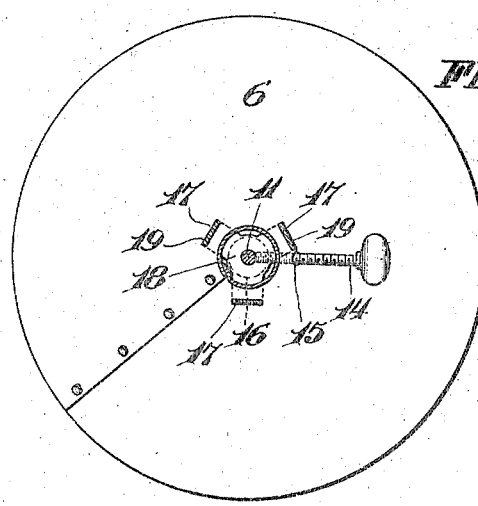
Fig. 3 is a similar view in transverse section on the line 3—3 of Fig. 1.
Figure 4:
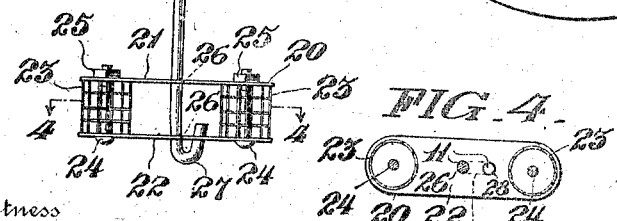
Fig. 4 is a view in transverse section on the line 4—4 of Fig. 1.

A supporting plate 7 is secured in cone 1, preferably by projecting the ends 8 of the plate 7 through slots 9 in the wall of the cone and bending said ends at an angle as shown clearly in Figs. 1 and 2.

The plate 7 is of such shape as to permit the passage of feed around its edges but holding back the great weight of feed to prevent a too rapid discharge. Plate 7 is provided with a central opening 10 receiving a rod 11, having a nut 12 screwed on to its upper threaded end and resting on plate 7, so that the rod is suspended from the plate and permitted a free rotary as well as lateral swinging action.

The feed cone 6 above referred to, is provided with an opening 13 at its apex, through which rod 11 is projected, and a set screw 14 projects through an opening 15 in feed cone 6, and is screwed into a collar 16 mounted on rod 11, so that by turning set screw 14 in one direction, it will jam against the rod 11 and hold the cone 6 at the proper adjustment thereon.

Agitating fingers 17 are carried by feed cone 6, and project upwardly through the open end 5 of cone 1. These fingers 17 are preferably made integral with a plate 18, and extend through openings 19 in feed cone 6, and are bent at an angle as clearly shown.

The plate 18 rests on top of the collar 16 so that by reason of the structure above described, the feed cone is so connected to the rod, that it is compelled to move with the rod, and yet be capable of adjustment on the rod in accordance with the feed to be dispensed.

On the lower end of rod 11, a bait holder 20 is supported. This bait holder 20 comprises upper and lower plates 21 and 22 respectively, which support wire mesh receptacles 23 between them and at their respective ends. Bolts 24 project through the plates 21 and 22 and through the centers of receptacles 23, and are secured in place by nuts 25 which can be easily removed to allow the receptacles to be filled with the desired bait.

The rod 11 projects through central openings 26 in plates 21 and 22, and at its lower end is bent upwardly, forming a hook 27 which projects through an opening 28 in lower plate 22, compelling the bait holder and rod to turn together.

The operation is as follows:

The poultry, in an endeavor to secure the bait in the receptacles 23 cause the rod 11 either a rotary or vibrating motion. This motion causes a movement of feed cone 6 with its fingers 17 in the outlet 5 of cone 1, and insures the dropping of a supply of feed.

The feed flows down the outer face of cone 6, and is scattered over the ground. The poultry from time to time, pick at the bait in the receptacles 23, and thus cause a movement of cone 6 to supply the necessary feed. It will be noted that the several parts can be easily disconnected and cleaned whenever desired, and hence the feeder can be kept in an entirely sanitary condition at all times.

Various slight changes may be made in the general form and arrangement of parts described without departing from my invention and hence I do not limit myself to the precise details set forth, but consider myself at liberty to make such changes and alterations as fairly fall within the spirit and scope of the appended claims.

Having fully described my invention, what I claim as new and desire to secure by Letters Patent is:

1. In a feeder, the combination with a cone having a discharge opening at its lower smaller end, of a rod having rotary support in said cone and projecting through the opening, a feed cone secured on the rod and having its upper smaller end projecting into the said opening, said feed cone having openings therein, a plate in the feed cone, fingers on the plate projecting through the openings in the feed cone, and extending upwardly through the first mentioned opening, and a bait holder supported by said rod.

2. In a feeder, the combination with a cone having a discharge opening at its lower smaller end, of a rod having a rotary support in the cone and projecting through the opening, means on the rod controlling the discharge of material through said opening, said rod having an upturned hook-shaped lower end, and a bait holder having a central opening receiving the rod and having another opening therein receiving the hook-shaped end of the rod and compelling the rod to turn with the bait holder.

3. In a feeder, the combination with a cone, having a discharge opening at its lower smaller end, of a rod supported in the cone and projecting through the opening, a feed cone secured on the rod and having its upper smaller end projecting into the opening, a pair of plates secured on the rod at its lower end, a pair of bait receptacles located between the plates adjacent their ends, and securing devices extending through the plates and clamping them against the receptacles.

In testimony whereof I have signed my name to this specification in the presence of two subscribing witnesses.

MARTIN L. KNODLE.

Witnesses:
ELEANOR F. MURRAY,
WILLIAM CONWAY.

Copies of this patent may be obtained for five cents each, by addressing the "Commissioner of Patents Washington, D. C."